(12) United States Patent
Kobayashi et al.

(10) Patent No.: US 9,610,732 B2
(45) Date of Patent: Apr. 4, 2017

(54) LAMINATION MOLDING APPARATUS

(71) Applicant: SODICK CO., LTD., Kanagawa (JP)

(72) Inventors: Katsuhiko Kobayashi, Kanagawa (JP); Ichiro Araie, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 30 days.

(21) Appl. No.: 14/887,348

(22) Filed: Oct. 20, 2015

(65) Prior Publication Data

US 2016/0107233 A1    Apr. 21, 2016

(30) Foreign Application Priority Data

Oct. 21, 2014 (JP) ................................. 2014-214399

(51) Int. Cl.
| | | |
|---|---|---|
| *B29C 35/08* | (2006.01) | |
| *B29C 67/00* | (2017.01) | |
| *B28B 1/16* | (2006.01) | |
| *B28B 17/00* | (2006.01) | |
| *B22F 3/105* | (2006.01) | |
| *B33Y 30/00* | (2015.01) | |
| *B33Y 10/00* | (2015.01) | |

(52) U.S. Cl.
CPC ...... *B29C 67/0085* (2013.01); *B29C 67/0077* (2013.01); *B22F 2003/1057* (2013.01); *B33Y 10/00* (2014.12); *B33Y 30/00* (2014.12); *Y02P 10/295* (2015.11)

(58) Field of Classification Search
CPC .......... B33Y 10/00; B33Y 30/00; B29C 67/77
USPC ...................................... 425/375, 174.4, 225
See application file for complete search history.

(56) References Cited

U.S. PATENT DOCUMENTS

| | | | | |
|---|---|---|---|---|
| 5,637,175 | A * | 6/1997 | Feygin | B22C 9/00 156/256 |
| 5,730,925 | A * | 3/1998 | Mattes | B29C 67/0077 219/121.73 |
| 7,323,132 | B2 * | 1/2008 | Abe | B29C 67/0077 264/161 |
| 7,754,135 | B2 * | 7/2010 | Abe | B29C 67/0077 264/161 |
| 8,062,020 | B2 * | 11/2011 | Abe | B29C 67/0077 264/308 |

(Continued)

FOREIGN PATENT DOCUMENTS

JP      2005-335203      12/2005

*Primary Examiner* — Joseph S Del Sole
*Assistant Examiner* — Thukhanh T Nguyen
(74) *Attorney, Agent, or Firm* — Jianq Chyun IP Office

(57) ABSTRACT

A lamination molding apparatus 10 includes a powder layer forming apparatus 20, a recoating head 30, a servo motor 16, a laser irradiating device 40, a numerical control apparatus 52, a laser control apparatus 54 and a computer aided manufacturing (CAM) system 56. The blade 31 moves in the horizontal axis direction so as to form the powder layer on a predetermined molding region. The laser control apparatus 54 controls the laser irradiating device 40 and calculates an irradiation range of a laser beam for every powder layer. The numerical control apparatus 52 obtains data of the irradiation range from the laser irradiating device 40 and outputs a move command such that the blade 31 moves at a feed speed faster than a pre-set feed speed adapted for recoating, in the molding region outside of the irradiation range.

5 Claims, 5 Drawing Sheets

(56) References Cited

U.S. PATENT DOCUMENTS

| | | | | |
|---|---|---|---|---|
| 8,221,850 B2* | 7/2012 | Fuwa | ............... | B22F 3/1055 264/401 |
| 8,267,683 B2* | 9/2012 | Inoue | ............. | B29C 67/0081 118/308 |
| 2002/0041818 A1* | 4/2002 | Abe | ............... | B29C 67/0077 419/7 |

* cited by examiner

LAMINATION MOLDING APPARATUS

CROSS-REFERENCE TO RELATED APPLICATION

This application claims the priority benefit of Japan Application No. 2014-214399, filed on Oct. 21, 2014. The entirety of the above-mentioned patent application is hereby incorporated by reference herein and made a part of this specification.

BACKGROUND OF THE INVENTION

Field of the Invention

The invention relates to a lamination molding apparatus (selective laser sintering apparatus) for generating a desired molding object by leveling a powder material with a blade so as to form a powder layer, and irradiating a laser beam so as to sinter a predetermined irradiation region of the powder layer.

Description of Related Art

A powder sintering lamination molding apparatus includes a blade for leveling a distributed powder material so as to form a powder layer at a predetermined molding region. In the case when the powder layer is sintered by an irradiation of a laser beam, a protrusion part may form on the surface of the sintered layer. When the blade impacts the protrusion at high speed, there is a possibility the edge of the blade may be damaged or the sintered layer separated, and therefore the blade is required to be moved at an adequately slow speed.

Patent document 1 discloses a method for lamination molding wherein the feed speed of a blade is lowered for forming a powder layer on a rough sintered layer which was formed on a well-sintered layer, such that the stall torque may be increased. According to the invention of patent document 1, the feed speed becomes slower at a predetermined sintered region where there is a high possibility of a protrusion part being formed, and therefore the time loss for recoating may be reduced, and the possibility of the molding operation being interrupted, or the blade or sintered region being damaged may be lowered.

PATENT DOCUMENTS

Japanese Published Unexamined Application No. 2005-335203.

SUMMARY OF THE INVENTION

An objective of the invention is to provide a lamination molding apparatus which may reduce a time required for recoating by accurately changing the feed speed of a blade. Other objectives and advantages of the invention are described in the following description.

The invention provides a lamination molding apparatus including a blade, a laser irradiating device, a laser control apparatus and a numerical control apparatus. The blade forms a powder layer at a predetermined molding region by moving in a horizontal axis direction for each sliced layer sliced from an entire molding space with a predetermined thickness, wherein the entire molding space includes a desired molding object. The laser irradiating device irradiates a laser beam at a predetermined irradiation region in the molding region. The laser control apparatus controls the laser irradiating device and calculates an irradiation range of the laser beam in the horizontal axis direction for the each sliced layers. The numerical control apparatus obtains data of the irradiation range from the laser control apparatus and outputs a move command, so as to move the blade at a feed speed faster than a preset feed speed adapted for recoating, at a molding range outside the irradiation range.

According to the lamination molding apparatus of the invention, when a powder layer is formed at a predetermined molding region, a blade may be moved at a faster feed speed than a feed speed adapted for forming the powder layer at the molding region outside an irradiation region of the laser beam according to the data of the irradiation range obtained from the laser control apparatus. As a result, at the minimum, a required leveled powder layer may be accurately formed at the irradiation region and the time required for recoating may be reduced. In turn, the molding time may be shortened.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
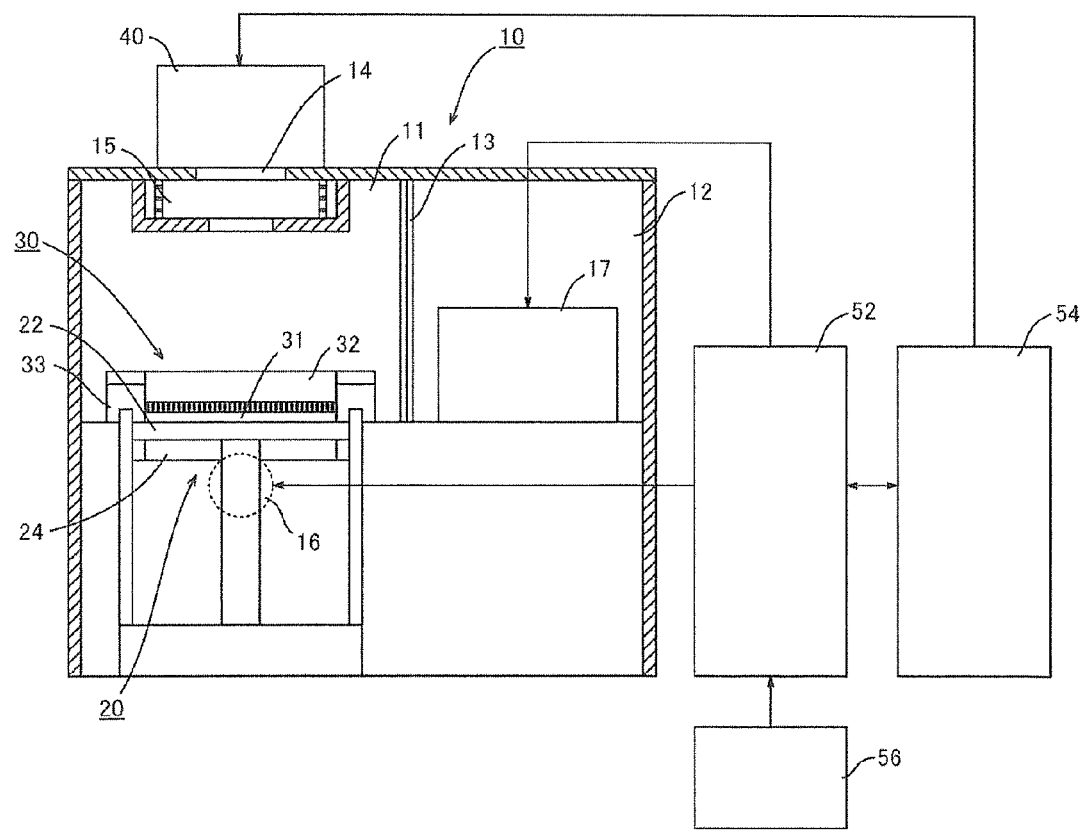
FIG. 1 is a schematic side view diagram illustrating a lamination molding apparatus 10 according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
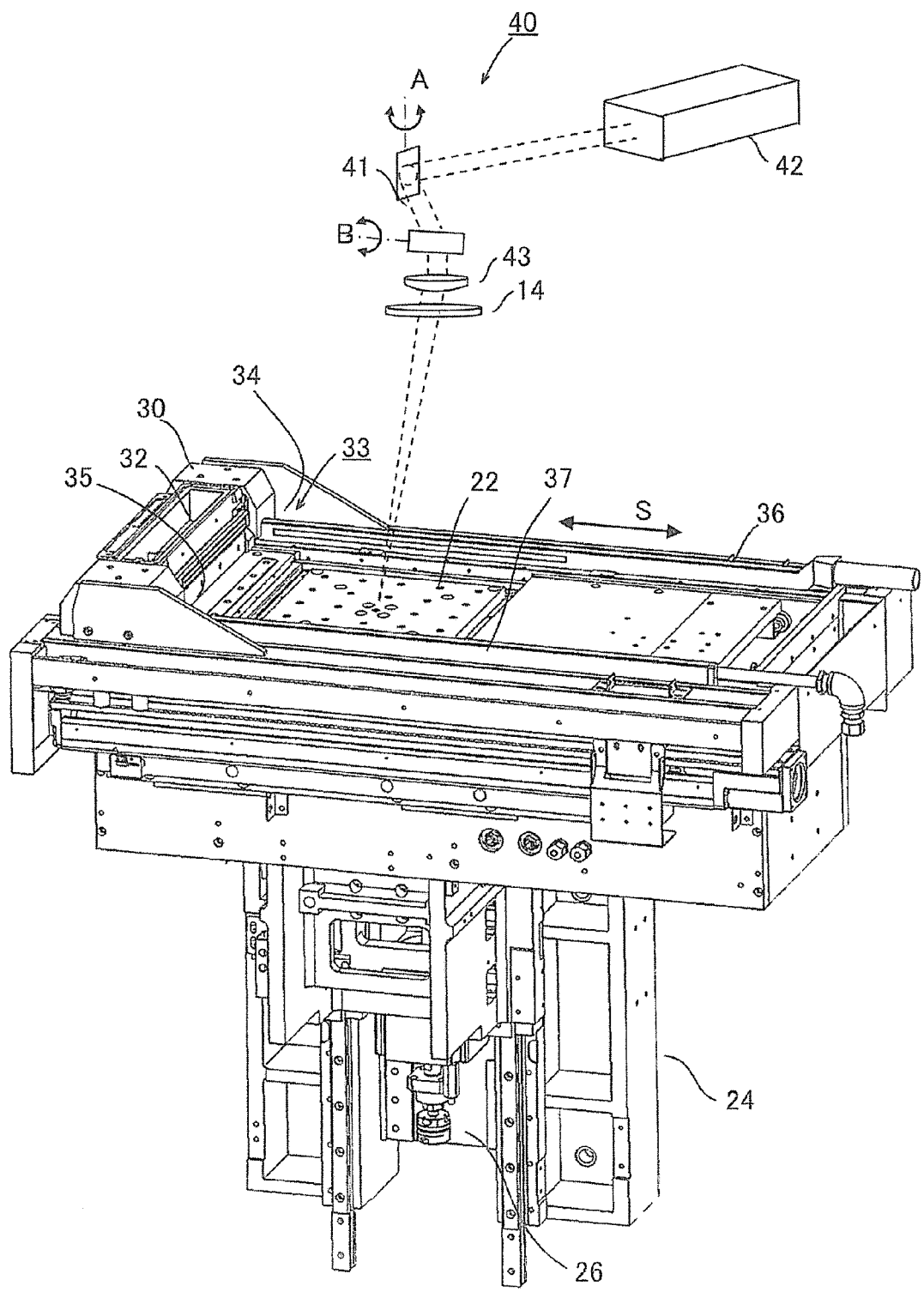
FIG. 2 is a perspective view illustrating structures of a lower side of the lamination molding apparatus 10 according to an embodiment of the invention.
Figure 3:
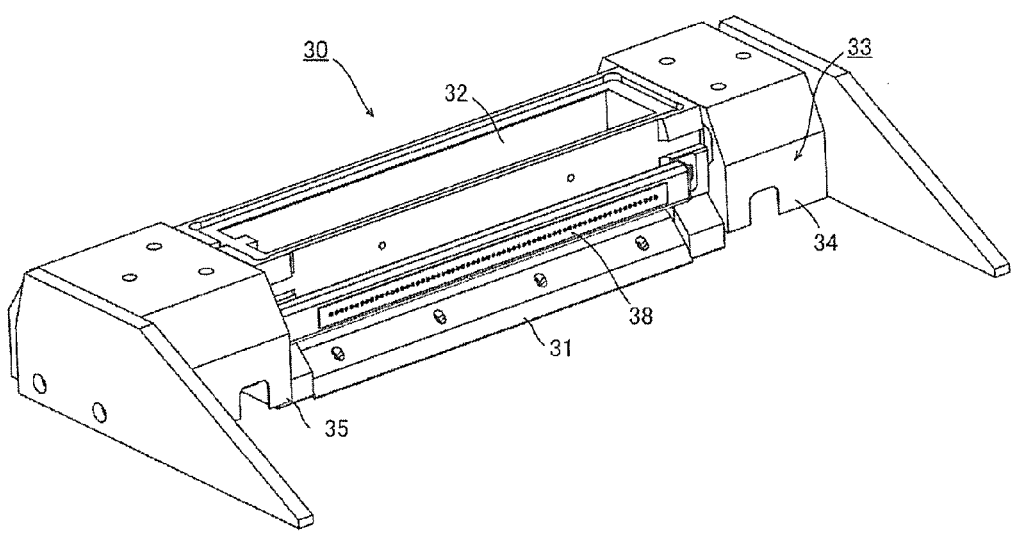
FIG. 3 is a perspective view illustrating a recoating head 30 of the lamination molding apparatus 10 according to an embodiment of the invention.

FIG. 1 is a schematic illustration of an overall configuration of a lamination molding apparatus 10 according to an embodiment of the invention. FIG. 2 illustrates structures of a lower side of the lamination molding apparatus 10. FIG. 3 illustrates a recoating head 30. In FIG. 1, FIG. 2 and FIG. 3, devices and components not directly relating to the invention may be omitted. Referring to FIG. 1, FIG. 2 and FIG. 3, a configuration of the lamination molding apparatus 10 of the invention is described below.

In the following, a molding region α represents an entire region where a powder layer is formed. An irradiation region β represents a region on the powder layer where a laser beam is irradiated. In each sliced layer in the entire molding space including a desired molding object sliced at a predetermined thickness, a sintering region γ represents a region of a sintered layer which has been formed on the irradiation region β by irradiation of the laser beam with a laser irradiating device 40. In particular, an irradiation range β' represents a range, in a horizontal axis direction which is in a moving direction of a blade 31, for irradiating the laser beam. In addition, a sintering range γ' represents a range of the sintered layer in the aforementioned horizontal axis direction. Furthermore, a molding range α' represents a range, in the aforementioned horizontal axis direction, for forming the powder layer.

The lamination molding apparatus 10 of the present embodiment is a metal powder sintering lamination molding apparatus. The lamination molding apparatus 10 includes a molding room 11 and a driving device room 12 which are formed in a chamber. The molding room 11 is disposed on a front side of a main body of the lamination molding apparatus 10 and the driving device room 12 is disposed on a backside of the main body. The molding room 11 and the driving device room 12 are separated by a bellows 13. Inert gas is supplied to the molding room 11 and to the driving device room 12 from an inert gas supply device not shown, and oxygen is removed from the chamber as much as possible at least during the molding period. The inert gas for example is nitrogen.

The molding region α is formed in the molding room 11. The molding region α coincides with a region where the powder material is distributed, except in the case where the powder material is partially distributed intentionally. A molding table 22 is housed in the molding room 11. The molding region α is formed on approximately the entire upper surface of the molding table 22. Every time a powder layer try to be formed, the molding table 22 drops down a height corresponding to the thickness of the powder layer such that a powder layer of a predetermined height is formed.

A powder layer forming apparatus 20 mainly includes the molding table 22, a support mechanism 24 for supporting the molding table 22 as well as lifting and lowering the molding table 22, a transfer mechanism 26 for transferring power to the support mechanism 24 and a driving apparatus which includes a motor not shown for driving the support mechanism 24. In addition, the powder layer forming apparatus 20 includes a recoating head 30. A molding plate may be disposed on the molding table 22.

The recoating head 30 includes the blade 31, a material collection box 32 and a guiding mechanism 33, as shown in detail in FIG. 3. The blade 31 moves in the horizontal axis direction, namely the left and right direction of the main body, so as to form the powder layer on the predetermined molding region α. The blade 31 is disposed on each of the two sides of a lower edge respectively of an outer frame of the material collection box 32, and sandwiches a center axis line in a lengthwise direction orthogonal to the aforementioned horizontal axis direction.

In a method for powder lamination molding, a process of uniformly leveling the powder layer repetitively is referred to as recoating or squeegeeing. The lamination molding apparatus 10 of the present embodiment is configured such that the molding table 22 drops down by a required thickness of the powder layer, and then the blade 31 moves along a reference height. Since the blade 31 has almost no effect of compressing the powder material, the aforementioned process is referred to as recoating in the invention.

In the present embodiment, a suction port 38 for absorbing fume in the molding room 11 and ejecting fume out of the molding room 11 is disposed on the recoating head 30. A non-movable material supply apparatus, not shown, for supplying powder material to the material collection box 32 of the recoating head 30 at suitable times is included above the recoating head 30. Powder material is replenished to the material collection box 32 from the material supply apparatus at suitable times, such that there is no shortage of the powder material in the material collection box 32 during the molding period.

The guiding mechanism 33 includes a pair of bearings 34, 35, and a pair of guide rails 36, 37 as axes material which are received by the bearings 34, 35 respectively. In the lamination molding apparatus 10 of the present embodiment, a suction pipe for absorbing fume is disposed on the guide rail 36, as shown in FIG. 2. In addition, a supply pipe for supplying inert gas is disposed on the guide rail 37.

The recoating head 30 reciprocates in the horizontal axis direction of the lamination molding apparatus 10 along the guide rails 36, 37 of the guiding structure 33 using a servo motor 16. The servo motor 16 moves according to a move command outputted by a numerical control apparatus 52. More specifically, the positioning of the servo motor 16 is controlled by a motor controller 58 disposed between the numerical control apparatus 52 and the servo motor 16. A rotating drive shaft of the servo motor 16 is connected with the recoating head 30 through a transfer mechanism constructed by a ball screw and a nut, and is disposed not to interfere with the movement of the powder layer forming apparatus 20.

The laser irradiating device 40 irradiates the laser beam on the predetermined irradiation region β of the predetermined molding region α. The laser irradiating device 40, as shown in FIG. 2, includes a laser scanning apparatus 41 having two galvanometer mirrors, a laser oscillator 42, a focus lens 43 and a plurality of laser transfer components not shown.

The laser beam with a predetermined energy which is outputted from the laser oscillator 42 arrives at the galvanometer mirrors through the laser transfer components. The laser beam reflected by the pair of galvanometer mirrors is converged using the focus lens 43 and passes through a transmission lens 14 disposed on a hole perforated on the ceiling of the chamber. The laser beam converged by the focus lens 43 is irradiated on the powder layer by a spot diameter that is predetermined.

The laser scanning apparatus 41 of the laser irradiating device 40 is disposed on the ceiling of the chamber of the molding room 11. Each of the galvanometer mirrors of the laser scanning apparatus 41 includes an actuator for rotating the galvanometer mirrors respectively. The actuator is driven according to a scan command received from a laser control apparatus 54. The laser scanning apparatus 41 moves the spot of the laser beam along a predetermined scan path at a predetermined moving speed using the laser control apparatus 54.

A fume diffusing apparatus 15 is disposed surrounding the transmission lens 14, such that the rising fume does not directly contact the transmission lens 14, so as to prevent the transmission lens 14 as a window from being contaminated with soot. In order to maintain the environment in the molding room 11, the fume diffusing apparatus 15 spouts the same inert gas as the inert gas that is supplied to the chamber having the molding room 11 and the driving device room 12, so as to form a downward laminar flow of the inert gas.

A driving apparatus 17 is disposed in the driving device room 12. The driving apparatus 17 is a moving apparatus for the machining tools of a machining apparatus. The driving apparatus 17 includes a first moving body reciprocating in a horizontal X-axis direction, namely the left and right direction of the main body, parallel to the horizontal axis direction of the moving direction of the blade 31 and a second moving body reciprocating in a horizontal Y-axis direction, namely the front and rear direction of the main body, orthogonal to the aforementioned horizontal axis direction. A machining head including a spindle is attached to the driving apparatus 17, and is movable with respect to the vertical direction which is the main axis of the machining apparatus, namely the up and down direction of the main body. The specific configuration of the above machining apparatus including the driving apparatus 17 is omitted from illustration.

Figure 4:
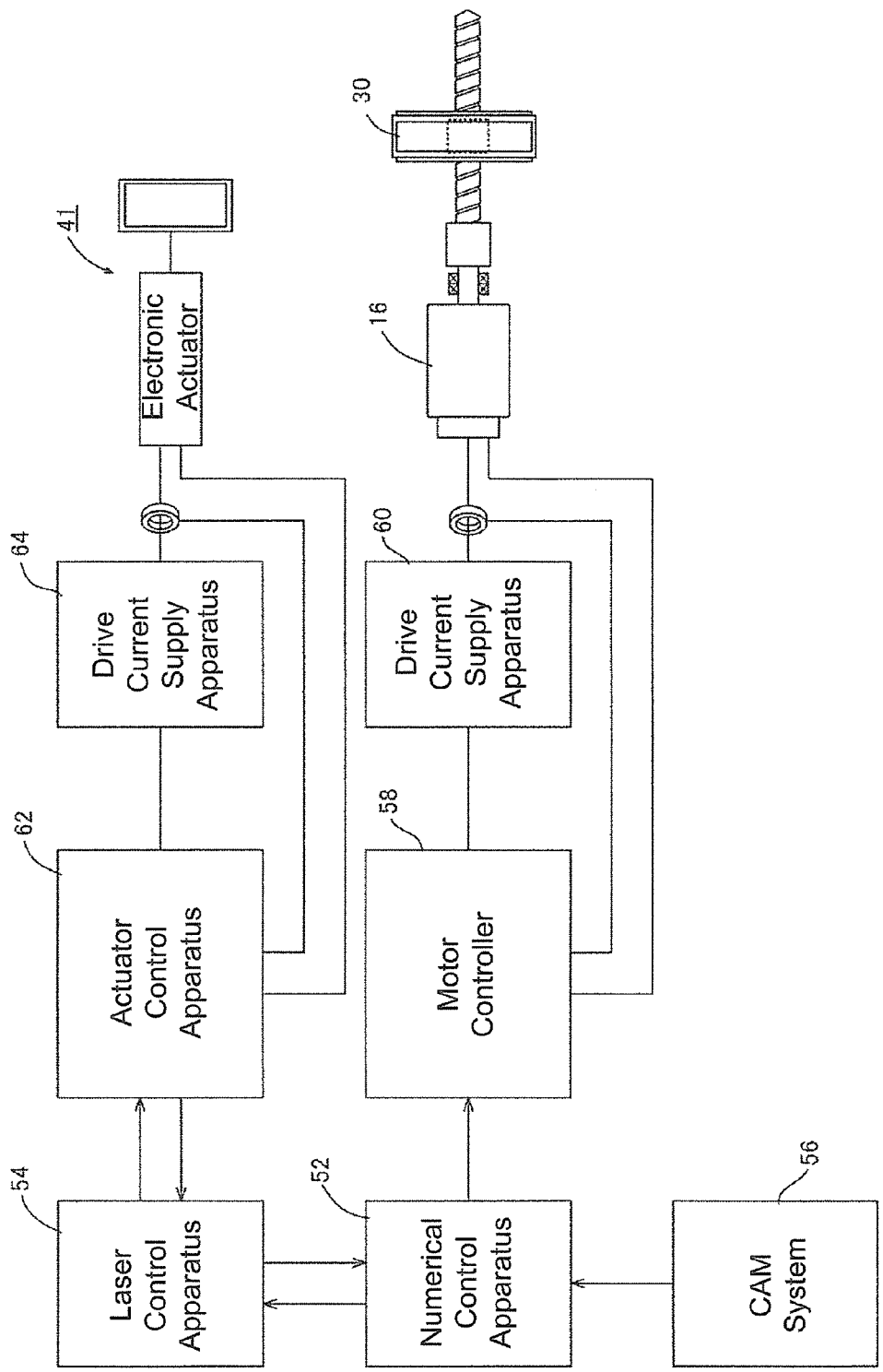
FIG. 4 is a block diagram illustrating a configuration of a control device of the lamination molding apparatus 10 according to an embodiment of the invention.
Figure 5:
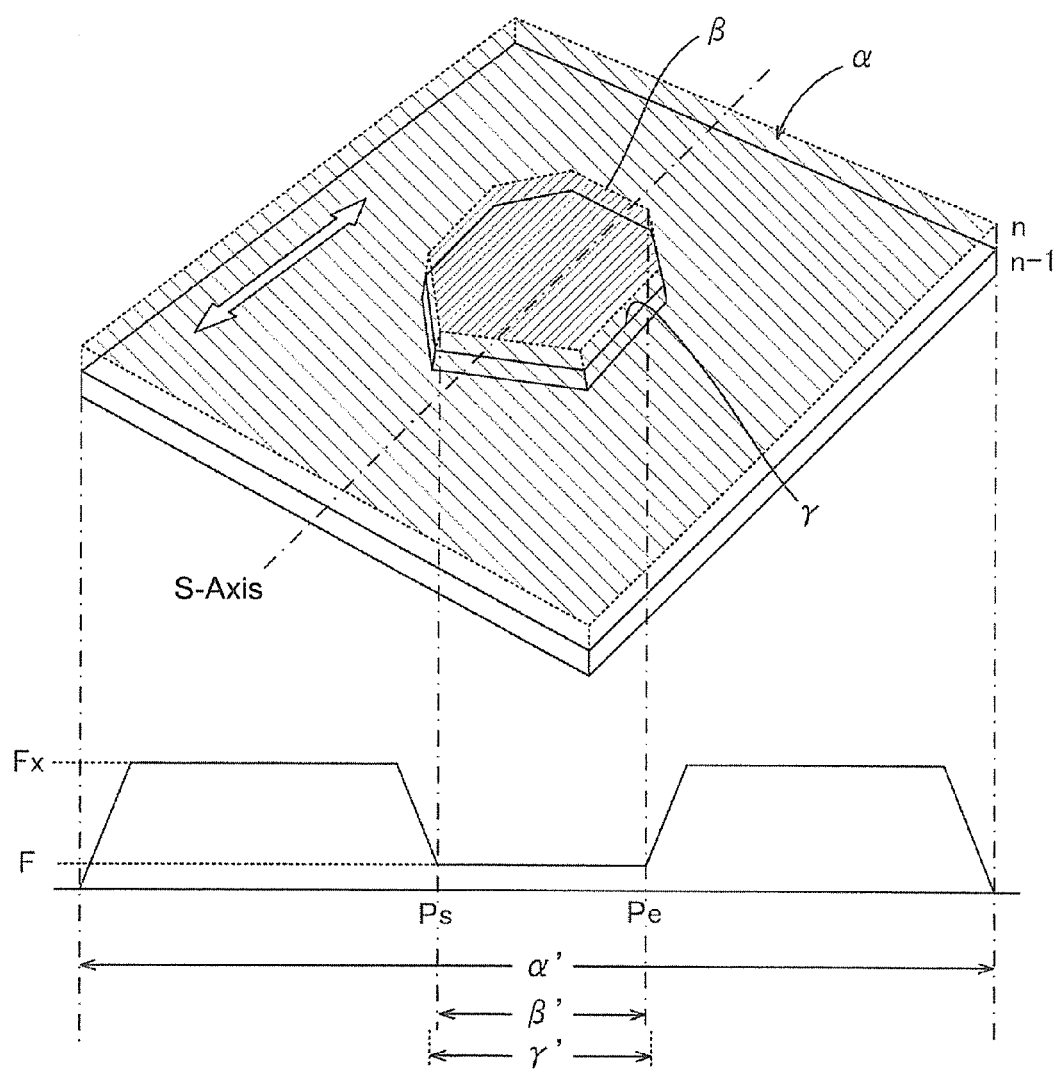
FIG. 5 is a diagram illustrating a change in a feed speed corresponding to a position of a blade 31 in the lamination molding apparatus 10 according to an embodiment of the invention.

FIG. 4 schematically illustrates in more detail a configuration of the controller of the lamination molding apparatus 10 according to an embodiment of the invention. FIG. 5 schematically illustrates a change in the feeding speed according to the position of the blade 31. In FIG. 5, the white arrow represents the moving direction of the blade 31. Referring to FIG. 4 and FIG. 5, a configuration and operation of the controller of the lamination molding apparatus 10 and the operation of the blade 31 are described below with reference to FIG. 1, FIG. 2 and FIG. 3 where appropriate.

In the lamination molding apparatus 10 of the present embodiment, an S-axis is a control axis of the horizontal axis direction in the moving direction of the blade 31, an X-axis is the control axis of the horizontal axis direction in the moving direction of the first moving body of the driving apparatus 17 of the machining apparatus, a Y-axis is the horizontal axis direction in the moving direction of the second moving body, a Z-axis is the control axis of the vertical axis direction in the moving direction of the machining head, a U-axis is the control axis of the vertical axis direction in the moving direction of the molding table 22. In addition, an A-axis and a B-axis are the control axes of the galvanometer mirrors of the laser scanning apparatus 41 respectively.

The controller of the lamination molding apparatus 10 mainly includes the numerical control apparatus 52, the laser control apparatus 54, and a computer aided manufacturing (CAM) system 56 disposed on a personal computer wherein the personal computer is connected to the numerical control apparatus 52 with a communication line.

The numerical control apparatus 52 controls the movements of the blade 31, the molding table 22, the driving apparatus 17 of the machining apparatus, the machining head and the spindle respectively. In addition, the numerical control apparatus 52 may control the three axes of the driving apparatus 17 and the machining head simultaneously, namely in the X-axis, the Y-axis and the Z-axis. As will be described in more detail later, in the molding range α' outside of the irradiation range β', the numerical control apparatus 52 outputs a move command such that the blade 31 moves faster than a pre-set feed speed that is adapted for recoating, namely a feed speed Fx faster than the set feed speed F. The laser control apparatus 54 controls the scan of the laser scanning apparatus 41.

The servo motor 16 reciprocates the recoating head 30 with the blade 31 in the horizontal axis direction in the moving direction of the blade 31, namely the S-axis direction. The motor controller 58 for controlling the position of the servo motor 16 is disposed between the numerical control apparatus 52 and the servo motor 16. The numerical control apparatus 52 outputs a move command to the motor controller 58 by a signal or data. The servo motor 16 receives a driving current according to the move command from a drive current supply apparatus 60 and moves the recoating head 30 at a predetermined speed. The motor controller 58 controls the position of the servo motor 16 through a feedback signal.

The laser scanning apparatus 41, in a wide sense, includes an actuator control apparatus 62 and a drive current supply apparatus 64. The laser control apparatus 54 outputs the scan command to the actuator control apparatus 62 by a signal or data according to the molding data including a scan program which is sent from the numerical control apparatus 52. After receiving the driving current according to the scanning command from the drive current supply apparatus 64, each of the electronic actuators of the laser scanning apparatus 41 tilts the galvanometer mirrors in a desired direction. The actuator control apparatus 62 controls the position of each of the electronic actuators of the laser scanning apparatus 41 through a feedback signal.

The CAM system 56 sends molding data including a numerical control program and irradiation conditions of the laser beam to the numerical control apparatus 52. The molding data includes outline data of the desired molding object for each of the sliced layers. The outline data determining the irradiation region β in the molding region α for each of the sliced layers may be obtained from the contour shape at the upper surface or the lower surface. The contour shape at the upper surface or the lower surface is obtained by slicing the solid data of the desired molding object at the predetermined thickness of the powder layers.

Before beginning molding, the numerical control apparatus 52 obtains the molding data from the CAM system 56. The numerical control apparatus 52 analyzes the molding data. The numerical control apparatus 52 transfers to the laser control apparatus 54 the molding data that is required for the laser beam irradiation including the outline data of the desired molding object, the scan pattern of the laser beam and the laser irradiation conditions. The molding data required for laser beam irradiation is simply referred to as irradiation data below. The irradiation data is sent to the laser control apparatus 54 through the numerical control apparatus 52, such that the numerical control apparatus 52 may associate and collectively control the laser scanning apparatus 41 and the movements of the plurality of moving bodies including each of the moving body of the driving apparatus 17, so as to perform molding by continuous processes.

When molding is started, the numerical control apparatus 52 decodes the numerical control program and outputs the move commands to the motor controller 58 in the order instructed by the numerical control program. The move command is distributed and outputted to each of the motor controllers respectively controlling the servo motor 16 for moving the blade 31, the motor moving the molding table 22, each of the servo motors moving each of the moving bodies including the driving apparatus 17 of the machining apparatus, and the spindle motor.

In addition, the numerical control apparatus 52 sends "molding sequence data" to the laser control apparatus 54, indicating which sliced layer the sintering is performed on. Every time molding sequence data is received, the laser control apparatus 54 calculates the scan path of the laser beam from the outline data and the scan pattern data of the desired molding object, for the sliced layer corresponding to that molding sequence. The laser control apparatus 54 calculates the actual outline of the irradiation region β according to the scan path calculated. The laser control apparatus 54 calculates the position of the irradiation range β' in the horizontal axis direction of the moving direction of the blade 31, namely the S-axis, from the outline of the irradiation region β for each of the sliced layers and sends the position of the irradiation range β' to the numerical control apparatus 52.

Once the data of the irradiation range β' is obtained from the laser control apparatus 54, the numerical control apparatus 52 performs calculations of the speed of the blade 31 from the data of the irradiation range β' at the moment according to the molding sequence data. More specifically, the numerical control apparatus 52 controls the blade 31 such that the blade 31 is at the set feed speed F starting from when the blade 31 first arrives at the irradiation range β' at a position Ps on the S-axis until when the blade 31 finally exits the irradiation range β' at a position Pe on the S-axis. In addition, in the molding range α' outside of the irradiation range β', the numerical control apparatus 52 obtains a speed change from the set feed speed F and the set acceleration speed, such that the feed speed Fx is as fast as possible within a range equal to or lower than the maximum feed speed.

In addition, in the lamination molding apparatus 10 of the embodiment shown in FIG. 5, the position data of the blade 31 included in the move command outputted by the numerical control apparatus 52 is the position of one of the two blades 31 which actually performs the recoating, wherein which one of the two blades preforms the recoating is determined by the moving direction.

The numerical control apparatus 52 which outputs the move command to the recoating head 30 is able to generate the data of the irradiation range β' from the molding data generated in the CAM system 56. However, since the configuration of the lamination molding apparatus 10 of the present embodiment may define the irradiation range β' according to the actual irradiation region β that can be obtained from the scan path of the laser beam, there is an advantage that there is no possibility of the wrong irradiation range being set. In particular, in the case when the irradiation region β in the laser control apparatus 54 is changed during the middle of the continuous molding process, the blade 31 may be moved in the irradiation range β' more accurately at the safe set feed speed F adapted for recoating.

In the controller of the lamination molding apparatus 10 of the present embodiment, the output of the move command in the numerical control apparatus 52 and the calculation and output of the irradiation range β' of each of the sliced layers in the laser control apparatus 54 are performed sequentially during the molding period. Consequently, the move commands to the blade 31 are calculated in real-time prior to the recoating; however the move commands of the blade 31 and the scan commands of the laser scanning apparatus 41 for all of the sliced layers may be calculated prior to molding and the calculation results may be stored in a memory device.

In the lamination molding apparatus 10 of the present embodiment, in the sliced layer n as shown in FIG. 5, the feed speed of the blade 31 is set faster than the set feed speed F for the molding range α' outside of the irradiation range β'; however the feed speed may also be changed to be faster than the set feed speed F for the molding range α' outside of the sintering range γ' corresponding to the sintering region γ of the sintered layer in the sliced layer of the lower layer n−1.

However, unless the sintering region γ is actually measured, the data of the sintering region γ approximately matches the data of the irradiation region β in the sliced layer of the lower layer n−1. In addition, a difference in position between the irradiation range β' of the sliced layer of the upper layer n and the sintering range γ' of the sliced layer of the lower layer n−1 is also influenced by the shape of the desired molding object and the thickness of each of the sliced layers, but is within a tolerated margin due to the speed change in accordance with the set acceleration speed.

Therefore, whether the data of the irradiation range β' or the sintering range γ' is used as a basis for the change in the feed speed of the blade 31, the resulting effect does not vary substantially.

Exemplary embodiments of the lamination molding apparatus of the invention have been described above. It will be apparent to those skilled in the art that various modifications and variations can be made to the structure of the lamination molding apparatus 10 without departing from the scope or spirit of the invention. For example, in the lamination molding apparatus 10 of the embodiment, the pair of blades 31 is disposed on two sides of the lower edge of the outer frame of the material collection box 32 of the recoating head 30; however only one blade may be disposed on the recoating head 30 as well.

What is claimed is:

1. A lamination molding apparatus, comprising:
    a blade, forming a powder layer at a predetermined molding region by moving in a horizontal axis direction for each sliced layer sliced from an entire molding space with a predetermined thickness, wherein the entire molding space includes a desired molding object;
    a laser irradiating device irradiating a laser beam at a predetermined irradiation region in the molding region;
    a laser control apparatus controlling the laser irradiating device and calculating an irradiation range of the laser beam in the horizontal axis direction for the each sliced layers; and
    a numerical control apparatus obtaining data of the irradiation range from the laser control apparatus and outputting a move command, so as to move the blade at a feed speed faster than a preset feed speed adapted for recoating, at a molding range outside the irradiation range.

2. The lamination molding apparatus as claimed in claim 1, further comprising a recoating head for moving the blade.

3. The lamination molding apparatus as claimed in claim 2, further comprising:
    a servo motor, for moving the recoating head in the horizontal axis direction; and
    a motor controller, controlling a position of the servo motor, wherein the numerical control apparatus outputs the move command to the motor controller.

4. The lamination molding apparatus as claimed in claim 1, wherein the feed speed adapted for recoating is preset, and the feed speed faster than the feed speed adapted for recoating is a speed as fast as possible for moving the blade.

5. A lamination molding apparatus, comprising:
    a blade, forming a powder layer at a predetermined molding region by moving in a horizontal axis direction for each sliced layer sliced from an entire molding space with a predetermined thickness, wherein the entire molding space includes a desired molding object;
    a laser irradiating device irradiating a laser beam at a predetermined irradiation region in the molding region;
    a laser control apparatus controlling the laser irradiating device and calculating an irradiation range of the laser beam in the horizontal axis direction for the each sliced layers; and
    a numerical control apparatus outputting a move command, so as to move the blade at a feed speed faster than a preset feed speed adapted for recoating, in a molding range outside of a sintering range in the horizontal axis direction of a sintered layer formed by irradiating the irradiation region with the laser beam using the laser irradiating device in the sliced layer under where the powder layer is formed.

* * * * *